Oct. 30, 1923.
J. BRITT
WELDING ELECTRODE HOLDER
Filed Jan. 10, 1922
1,472,581
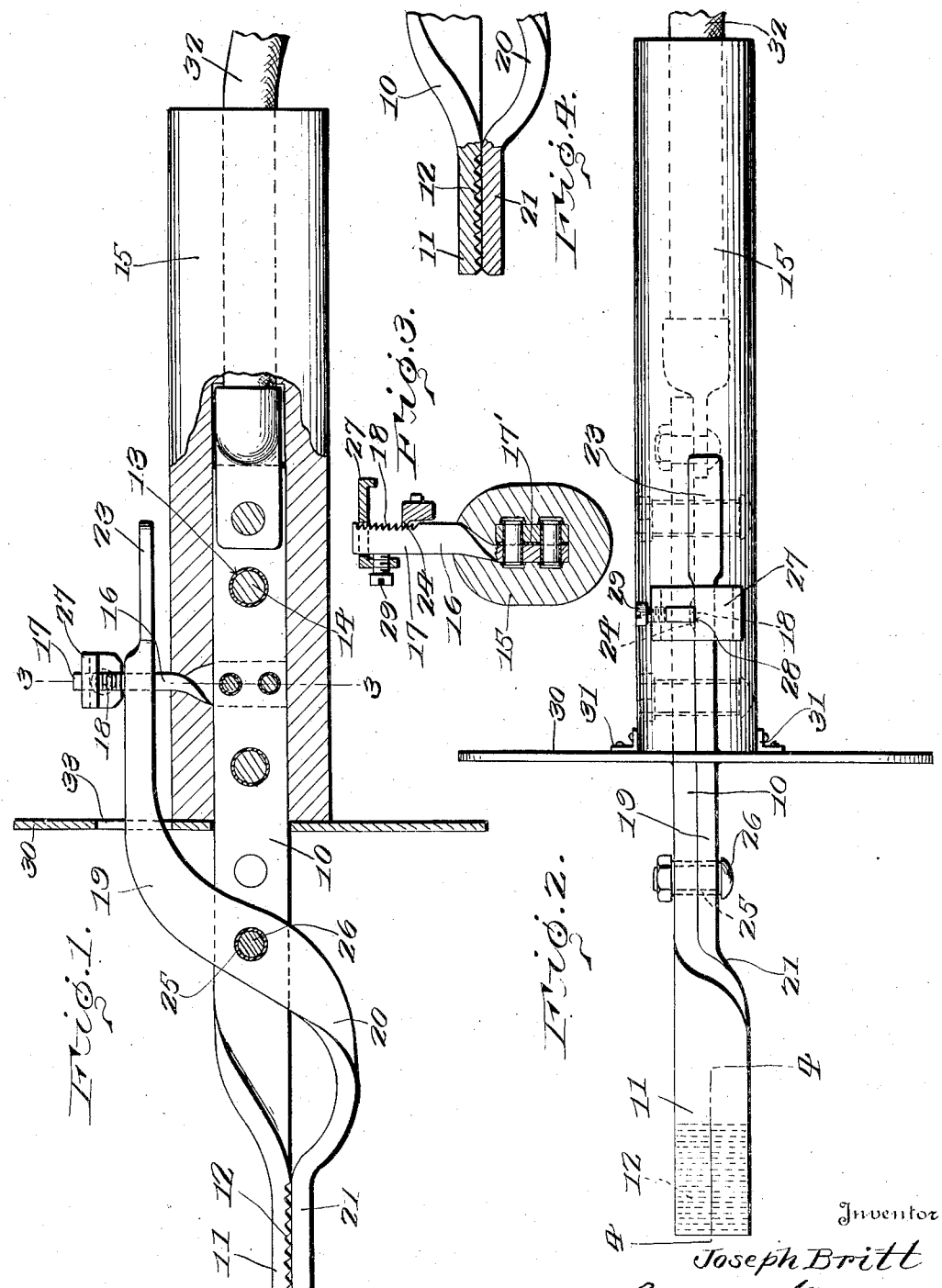
Inventor
Joseph Britt
By [signature]
Attorney Patented Oct. 30, 1923.

1,472,581

UNITED STATES PATENT OFFICE.

JOSEPH BRITT, OF NEW YORK, N. Y.

WELDING ELECTRODE HOLDER.

Application filed January 10, 1922. Serial No. 528,333.

*To all whom it may concern:*

Be it known that I, JOSEPH BRITT, a citizen of the United States, residing at New York city, in the county of New York, State of New York, have invented certain new and useful Improvements in Welding Electrode Holders; and I do hereby declare the following to be a full, clear, and exact description of the invention, such as will enable others skilled in the art to which it appertains to make and use the same.

This invention relates to new and useful improvements in holders and particularly to electrode holders.

One object of the invention is to provide an electrode holder which is especially adapted for holding electrodes used in welding, and which is so constructed that electrodes of different diameters may be easily and quickly secured therein.

Another object of the invention is to provide a device of this character wherein the operator may insert or remove the electrodes with one hand while easily and quickly operating the holding means with the other hand.

Heretofore various types of electrode holders have been used but each with decided disadvantages. One type of holder provides a pair of jaws which must be sprung apart by forcing the electrode between the jaws. When this type of holder is new, the insertion of the electrode is difficult, and when the holder has been in use for a short time the jaws become so weakened as to render it difficult or impossible to hold the electrode.

Another form consists in spring jaws which must be pressed together to permit the insertion of the electrode, but these jaws are not strong enough to permit the operator to bend the electrode or pull the electrode from the work when the electrode sticks to it.

Still another form has a cam for holding the electrode, but the cam becomes heated and renders it difficult to remove the stub of the electrode. Furthermore the surfaces over which the cam moves becomes coated with metal deposits.

A further form depends on screw threads to hold the electrode, while a still further form is in the design of pliers which must be firmly gripped by the operator to hold the electrode in the jaws. The force exerted by the operator to hold the jaws sufficiently tight to grip the electrode, detracts from the dexterity required to manipulate the electrode of the work, and to advance the electrode as it fuses.

All of these disadvantages are overcome in the present device.

Other objects and advantages will be apparent from the following description when taken in connection with the accompanying drawings:

In the drawing:

Figure 1 is a side elevation of an electrode holder made in accordance with the invention.

Figure 2 is a top plan view of the same.

Figure 3 is a vertical sectional view on the line 3—3 of Figure 1.

Figure 4 is a vertical longitudinal sectional view through the electrode holding jaws, on the line 4—4 of Figure 2.

Referring particularly to the accompanying drawing 10 represents an elongated flat metal strip which has one end twisted to lie in a plane at right angles to the body of the strip, as shown at 11, and having one face thereof formed with transverse corrugations 12. Formed in the body of the strip 10 are the longitudinal series of openings 13, certain of which receive bolts 14 to secure to the strip the insulated hand grip 15. Secured to the strip 10, and extending vertically therefrom, is a keeper 16, the same being twisted to produce the upper portion 17, which stands in a plane at right angles to the strip 10. The one edge face of this upper portion 17, of the keeper, is formed with a plurality of ratchet teeth 18. A plate of insulation 17' is disposed between the strip 10 and the member 16.

A second flat metal strip 19 has its forward end twisted at 20 so that its forward end 21 lies in a plane parallel with the portion 11, but this portion 21 is provided with a smooth face which cooperates with the corrugated face of the member 11 to clamp therebetween the electrode not shown. The other end of the member 19 extends rearwardly over the hand-grip 15, with its rear end flattened in a horizontal plane, to provide the thumb-piece 23. Forwardly of the thumb-piece 23 the member 19 is formed with a longitudinally sharpened lip 24 which is arranged to engage with the teeth 18 of the keeper 16.

Through the opening adjacent the electrode gripping jaws 11 and 21 there is disposed a sleeve or bushing 25, and through this bushing is disposed the pivot bolt 26, by means of which the member 19 is pivotally connected with the member 10.

An inverted angular U-shaped member 27 has an angular opening 28 which receives the upper portion 17 of the keeper 16, one leg of said member 27 carrying a screw 29 which is arranged to be driven into biting contact with one edge face of the portion 17, to hold the member 27 in different adjusted positions. The member 27 extends transversely across the lip portion of the member 19 and is arranged at such a height thereabove as to limit the upward movement of the portion of the member, when the jaws 11 and 21 are separated for removing or inserting an electrode.

Secured to the member 10, at the forward end of the hand grip 15, is a shield disk 30, the same being attached to the member 10 by means of the brackets 31. In this shield is formed an elongated opening 33 within which the portion of the member 19, rearwardly of its pivot 26, is adapted to play as the said member is moved to grip or release the electrode.

As shown in the drawing, the conductor 32 is shown as secured to the rear end of the member 10, but this position may be varied as desired. For instance, the conductor may be secured to the member 10 forwardly of the shield 30, or it may be secured to both the rear end of the member 10 and to the same forwardly of the shield.

By means of the construction illustrated and described, it will readily be seen that when the electrode is clamped between the jaws, there will be no danger of the same being accidentally displaced, especially when the operator wishes to bend the electrode or remove the electrode from the work, should the same stick or "freeze" to the work. The lip 24, engaging with the teeth of the member 16, relieves the operator of the tight grip which is necessary in other devices heretofore. The operator's attention can thus be concentrated on the proper manipulation of the holder and electrode, without the inconvenient and dangerous necessity of watching the gripping jaws to see whether or not they are firmly holding the electrode.

What is claimed is:

1. An electrode holder comprising a pair of pivoted members having gripping jaws, one of the members having a handle and the corresponding end of the other member a thumb-piece, a notched keeper carried by the first member, the second member having a lip for engagement with the keeper, and a removable and adjustable stop member on the keeper for limiting the upward movement of the thumb-piece portion of the second member, and thereby the opening movement of the gripping jaws.

2. In an electrode holder, a pair of pivotally connected members having cooperating gripping jaws and handles, one of the handles constituting a hand-grip while the other constitutes a finger-piece, means on the hand-grip for engagement by the finger-piece for holding the latter against movement and the jaws in gripping position, and means adjustable on the hand-grip carried means for engagement by the said finger-piece for limiting the movement of the finger-piece member and thereby the opening movement of the jaw.

In testimony whereof I affix my signature, in the presence of two witnesses.

JOSEPH BRITT.

Witnesses:
C. F. THORNELL,
A. S. DONOGHUE.